United States Patent

Willis

[11] 4,167,025
[45] Sep. 4, 1979

[54] AUTOMATIC PEAK BEAM CURRENT LIMITER

[75] Inventor: Donald H. Willis, Indianapolis, Ind.

[73] Assignee: RCA Corporation, New York, N.Y.

[21] Appl. No.: 876,238

[22] Filed: Feb. 9, 1978

[51] Int. Cl.$^2$ .............................................. H04N 5/68
[52] U.S. Cl. ..................................... 358/243; 315/30
[58] Field of Search ......................... 358/74, 168, 243; 315/30

[56] References Cited

U.S. PATENT DOCUMENTS

| | | | |
|---|---|---|---|
| 3,842,201 | 10/1974 | Ghaem-Maghami et al. ...... | 358/243 |
| 3,848,945 | 11/1974 | Holzrichter ............................ | 315/30 |
| 3,914,545 | 10/1975 | Engel .................................... | 358/243 |
| 3,980,822 | 9/1976 | Suzuki et al. ........................ | 358/243 |
| 4,017,681 | 4/1977 | Smeulers et al. .................... | 358/243 |
| 4,067,048 | 1/1978 | Norman .............................. | 358/243 |
| 4,079,424 | 3/1978 | Serafini ............................... | 358/243 |

Primary Examiner—Howard W. Britton
Assistant Examiner—Joseph A. Orsino, Jr.
Attorney, Agent, or Firm—Eugene M. Whitacre; William H. Meagher; Ronald H. Kurdyla

[57] ABSTRACT

In a video signal processing system, apparatus for limiting excessive peak and average beam currents demanded by a kinescope in response to image representative video signals. A control signal derived by a sensing circuit in response to excessive beam current is applied to the kinescope in a manner to limit excessive beam currents above a threshold level. The sensing circuit includes a capacitor arranged with a conductive diode to form an average responding filter such that the sensing circuit derives a control voltage representative of excessive average beam current in a first beam current limiting mode. In a second beam limiting mode, when beam current exceeds a predetermined level, the diode is rendered nonconductive and the capacitor is decoupled for average detection purposes. In this mode, the control signal is free to vary in accordance with rapid variations in peak beam current.

14 Claims, 1 Drawing Figure

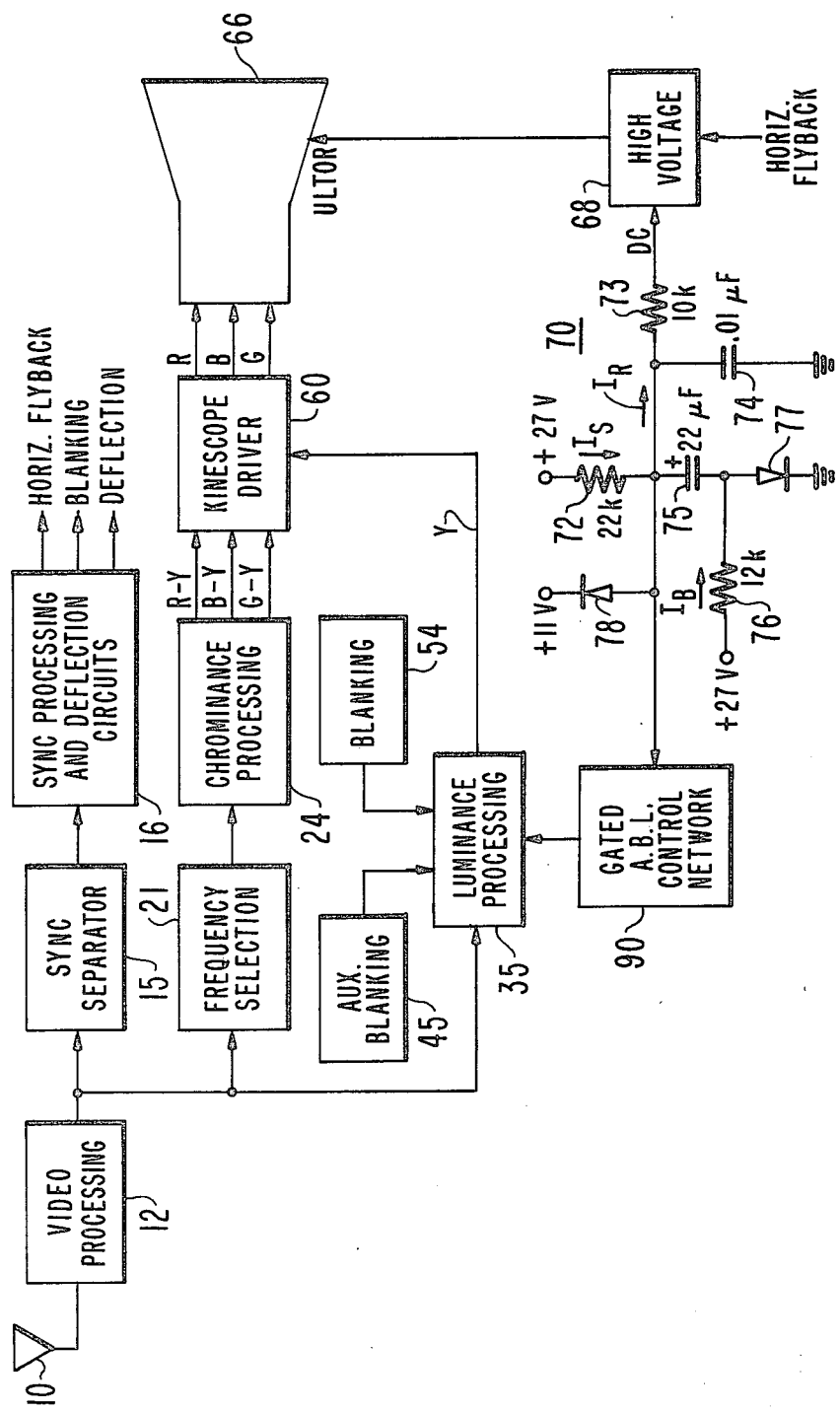

AUTOMATIC PEAK BEAM CURRENT LIMITER

This invention relates to apparatus for automatically limiting excessive beam currents drawn by an image reproducing device in a video signal processing system such as a television receiver. In particular, the invention relates to such apparatus capable of limiting short duration peak beam currents as well as average beam currents of relatively longer duration.

Excessive peak or average beam currents can cause a television receiver to produce a degraded image. In this regard, excess beam currents can cause degradation of the performance of the receiver deflection system which is operatively associated with an image reproducing kinescope, electron beam spot defocussing, and picture blooming. High beam currents can also exceed the safe operating current capability of the kinescope, possibly damaging the kinescope and associated circuit components which may be sensitive to high beam current levels.

Various automatic beam current limiter circuits responsive to average beam current levels are known. These circuits typically respond to excessive beam current levels occurring at a rate not exceeding the vertical image scanning rate of the kinescope. The average responding circuits essentially ignore peak increases in beam current levels occurring only for a few horizontal image lines of a vertical scanning interval, for example. Because of the inherent insensitivity of average responding circuits to transient or peak increases in beam current of less than average duration (e.g., less than a vertical image scanning period), a special problem exists for video signal processing systems wherein it is desired to limit such peak currents for a variety of reasons. Excessive peak beam current levels can be attributable to the information content of a received image-representative video signal, such as a signal representative of black-to-white image transitions occurring in one or more succeeding vertical image scanning intervals. Excessive peak beam currents can also occur as a result of transients produced when switching from one channel of the receiver to another. In any case, excessive peak beam current levels can adversely affect receiver circuits (e.g., deflection circuits) which may be sensitive to high levels of peak beam current, even if the maximum allowable average beam current level has not been exceeded.

Systems which provide for limiting both average and peak beam currents are known. For example, U.S. Pat. No. 3,980,822 (Suzuki et al.) discloses an arrangement wherein excess average beam currents are sensed and limited by means including a first limiter circuit with a first time constant. Peak or transient beam currents are sensed and limited by a second limiter circuit, distinct from the first circuit, exhibiting a short time constant relative to the first time constant. U.S. Pat. No. 4,017,681 (Smeulers et al.) also discloses an arrangement including a circuit for detecting excess peak beam currents, and a separate circuit for detecting excess average beam currents.

An analogous arrangement is disclosed in U.S. Pat. No. 3,914,545 (Engel). This patent describes a system wherein a derived control signal representative of the average level of a luminance signal varies the gain of a luminance signal amplifier inversely with changes in the average level. The control signal is modified by a peak limiter circuit whenever the instantaneous luminance signal exceeds a threshold level. The control signal is further modified by a signal from a beam current limiter network responsive to high levels of average beam current.

Because of the nature of a peak or transient excess beam current condition, a peak beam current limiter should exhibit a rapid response in order to provide appropriate compensation. It is also desirable in many instances for an automatic beam current limiter to be capable of limiting both excessive peak and average beam currents. Particularly in this instance, complex, uneconomical circuit arrangements should be avoided whenever possible.

Apparatus according to the present invention is included in a video signal processing system having a kinescope for reproducing an image in response to video signals, for limiting excessive kinescope current conduction. The apparatus includes a sensing circuit for deriving a control signal indicative of variations in the magnitude of kinescope current above a selected threshold level. The control signal is utilized to limit kinescope current in accordance with the magnitude of the control signal. The sensing circuit includes a filter network subject to alternative operation in first and second states. When in the first operating state, the filter exhibits a restricted pass band such that the control signal is indicative of only relatively long term variations in the magnitude of the kinescope current. When in the second operating state, the filter exhibits a significantly wider pass band such that the control signal additionally follows relatively short term variations in kinescope current. The filter network is subject to switching from the first to the second state when the kinescope current exceeds a predetermined level.

The single FIGURE of the drawing shows, partially in block diagram form and partially in schematic circuit diagram form, a general arrangement of a color television receiver employing apparatus constructed in accordance with the present invention.

The drawing depicts a color television receiver including a video signal processing unit 12 for receiving radio frequency signals from an antenna 10 and for translating these signals through intermediate frequency amplifying and detecting stages (not shown) to provide a composite video signal. The composite video signal contains luminance, chrominance, sound and synchronizing components.

A sync separator 15 serves to separate the synchronizing (sync) component from the composite video signal to provide periodic line sync pulses. These pulses are further processed by sync processing and deflection circuits 16 to provide horizontal flyback signals, and horizontal and vertical blanking and deflection signals as known.

A frequency selection unit 21 (e.g., a bandpass filter) selectively couples the chrominance component of the composite video signal to chrominance signal processing unit 24 (e.g., including amplifier and demodulator stages) to derive R-Y, B-Y and G-Y color difference signals. These signals are applied as inputs to a kinescope driver stage 60.

The luminance component of the composite video signal is amplified and otherwise processed by a luminance signal processing unit 35 in a luminance channel of the receiver. Luminance processing unit 35 includes a luminance signal clamping circuit for providing a clamped luminance output signal Y, as disclosed in a copending U.S. patent application Ser. No. 819,935 of R. P. Parker, now U.S. Pat. No. 4,110,787 entitled "Combined Blanking Level And Kinescope Bias Clamp For A Television Signal Processing System", assigned to the same assignee as the present invention. The periodic operation of the clamping circuit is controlled in response to periodic blanking pulses supplied during each image retrace blanking interval by a source of blanking pulses 54. Periodic auxiliary blanking pulses of predetermined magnitude supplied by an auxiliary blanking unit 45 are added to the luminance signal prior to clamping during each blanking interval. This and other aspects of unit 35 are described in greater detail in the last mentioned U.S. patent application.

The clamped luminance signal Y is supplied to an input of kinescope driver 60, where the luminance signal is combined with the color difference signals from unit 24 to form R, B and G color signals. These signals are then coupled to signal inputs (e.g., cathode electrodes) of a kinescope 66 for reproducing a color image.

High operating voltages for focus (not shown) and ultor electrodes of kinescope 66 are provided by a high voltage supply 68 (e.g., voltage tripler) in response to positive, periodic horizontal flyback pulses occurring during horizontal retrace scanning intervals. A current supply including a source of positive direct voltage (+27 volts) and a current determining resistor 72 provides a current $I_S$ and is coupled to a D.C. input of high voltage unit 68 via a resistor 73. Current flowing in resistor 72 includes a component $I_R$ representative of the beam current (i.e., ultor current) demand of the kinescope in response to the luminance and chrominance signals. This current flows into the D.C. input of high voltage unit 68 and is sometimes referred to as a "resupply" current (i.e., a current via the high voltage unit to recharge or resupply the ultor electrode voltage of the kinescope when depleted as a result of beam current conduction). The described current supply is typically associated with the high voltage supply in a television receiver for purposes of providing the resupply current. The resupply current typically consists of current pulses recurring at the horizontal line scanning rate. Some A.C. filtering of horizontal rate voltages which these current pulses tend to produce at the D.C. input terminal of high voltage unit 68 is provided by a filter capacitor 74.

Excessive levels of peak and average beam currents are sensed by a circuit 70. Sensing network 70 is operatively associated with the supply current source including resistor 72, and comprises a large value, average responding filter capacitor 75 and a normally conductive clamp diode 78. Network 70 also includes a normally conductive diode 77 for conductively coupling the negative plate of filter capacitor 75 to a point of reference potential (ground) when beam current demand does not exceed a predetermined level under normal operating conditions of the receiver, and also when a condition of excessive average beam current demand exists, as will be discussed. Diode 77 is forward biased into conduction by a reference current $I_B$ of predetermined value, as supplied by a current source including a resistor 76 and a source of positive direct voltage (+27 volts).

A voltage representative of the level of resupply current (i.e., ultor current) is developed on the positive terminal of capacitor 75 when the resupply current exceeds a predetermined threshold level indicating the presence of excessive peak or average beam current demand, as will be explained. This voltage is supplied to an input of a gated automatic beam limiter (ABL) control network 90, which can be of the type disclosed in a copending, concurrently filed U.S. patent application of R. P. Parker, entitled "Gated Automatic Beam Current Limiter In A Video Signal Processing System", and assigned to the present assignee. Unit 90 then develops an output control signal in accordance with the magnitude of the excessive peak or average beam currents. This control signal is applied to luminance processor 35 in such a manner as to translate the luminance signal in a direction to limit excess beam currents.

In accordance with this invention, the otherwise average responding operation of sensing circuit 70 is modified in the presence of high levels of peak or momentary beam current demand, as manifested by resupply current $I_R$. This is accomplished by the coaction of filter capacitor 75 with diode 77 and reference bias current $I_B$.

During normal operating conditions, diode 78 clamps the voltage at the positive terminal of capacitor 75 to +11 volts plus the voltage drop across diode 78 (approximately 0.6 volts), or +11.6 volts. A portion of current $I_S$ flows through clamp diode 78 when conducting. The control signal output from ABL network 90 is inhibited during this time, whereby the luminance signal is processed in normal fashion by unit 35.

The value of resistor 72 and the voltage drop thereacross (15.4 volts) determine a normal level of current $I_S$ (0.7 milliamperes), which corresponds to a first threshold current level of beam limiter operation. This current divides between diode 78 when conducting and the D.C. input of high voltage source 68 in accordance with the beam current demand of kinescope 66 as manifested by the level of resupply current $I_R$.

Sensing circuit 70 exhibits dual mode operation for sensing both excessive average and peak beam current demand. Diode 77 and reference current $I_B$ are specifically employed for this purpose. The threshold level at which peak beam currents are sensed and limited is determined by the magnitude of current $I_B$ (approximately 2.25 milliamperes).

When the average resupply current exceeds the first threshold level determined by current $I_S$, current drive for clamp diode 78 is depleted and diode 78 ceases conducting. Since the positive terminal of capacitor 75 is no longer clamped by diode 78, the voltage at this terminal decreases to a less positive level at a rate determined by the amount by which the first threshold current level is exceeded. The ABL control network 90 responds to this less positive voltage by providing a corresponding output control signal which serves, for example, to translate the D.C. level of the luminance signal in a direction to cause kinescope 68 to conduct proportionally less average beam current. Under this condition, diode 77 remains conductive and current $I_B$ flows to ground through diode 77, thereby preserving the role of capacitor 75 as a low pass, average responding filter.

The role of capacitor 75 as an average responding filter is altered when kinescope 66 momentarily demands high peak levels of resupply current. Specifically, as in the case of excessive average current demand, a sudden large increase in resupply current $I_R$ in response to beam current demand causes the positive terminal of capacitor 75 to become less positive when the first threshold current level is exceeded.

Diode 77 ceases conducting since the forward bias current for diode 77 otherwise provided by current $I_B$ now flows through capacitor 75 instead of through diode 77 to ground, in accordance with the rate of change of capacitor 75 voltage and the magnitude of the peak resupply current demand. This effect is produced since the current through a capacitor (e.g., capacitor 75) is determined by the product of the value of the capacitor and the rate of change of voltage across the capacitor. Thus for a given value of capacitance, the capacitor current increases as the rate of change of capacitor voltage increases. In this instance, the rapid rate of change of the voltage across capacitor 75 is produced in response to the sudden increase in peak resupply current. This rapid rate of voltage change is essentially unaffected by the small value of horizontal rate filter capacitor 74.

With capacitor 75 being decoupled in the presence of a rapid increase in peak resupply current demand as described, the current $I_B$ then flowing through capacitor 75 thereafter flows primarily in the resupply current path to the resupply current input of high voltage supply 68. The beam current representative control voltage appearing at the positive terminal of capacitor 75 decreases rapidly in accordance with any further rapid increase in the level of resupply current $I_R$, since capacitor 75 no longer acts as a low pass, average responding filter during this condition. The described action permits the beam limiter control circuitry to respond quickly (i.e., track closely) and limit rapid or momentary increases in beam current demand, greater than the vertical scanning rate, in accordance with the magnitude of the control signal appearing at the positive terminal of capacitor 75.

It is noted that the level at which peak beam current limiting commences can be adjusted to suit the requirements of a particular system by tailoring the value of reference bias current $I_B$. Specifically, peak beam current limiting can be activated sooner by reducing the value of reference current $I_B$. When this rapidly increasing resupply current exhibits a magnitude equal to the sum of reference current $I_B$ and supply current $I_S$, the current in capacitor 75 equals current $I_B$. Therefore, diode 77 ceases conducting and capacitor 75 is decoupled from ground. The sum of currents flowing through resistor 76 and resistor 72 then increases in accordance with the amount by which current $I_R$ increases above the sum of currents $I_S$ and $I_B$.

While the invention has been described in terms of a preferred embodiment, it should be recognized that various modifications can be made by persons skilled in the art without departing from the scope of the invention. Component values and other examples of operating parameters have been mentioned as an aid to understanding the invention and are not intended to be limiting.

What is claimed is:

1. In a video signal processing system including a kinescope for reproducing an image in response to video signals, apparatus for limiting excessive kinescope current conduction comprising:
   means for deriving a control signal indicative of variations in the magnitude of kinescope current above a selected threshold level; and
   means for utilizing said control signal to limit kinescope current in accordance with the magnitude of said control signal; and wherein
   said control signal deriving means includes filter means subject to alternative operation in a first state and a second state; said filter means, when in said first state, exhibiting a restricted pass band such that said control signal is indicative of only relatively long term variations in the magnitude of said kinescope current; said filter means, when in said second state, exhibiting a pass band significantly wider than said restricted pass band such that said control signal additionally follows relatively short term variations in said kinetic current; and said filter means being subject to switching from said first state to said second state when said kinescope current exceeds a predetermined level.

2. Apparatus according to claim 1, wherein said signal deriving means additionally comprises a controlled conduction device exhibiting first and second conductive states in the presence of excess kinescope current exhibiting said relatively long and short term variations, respectively.

3. Apparatus according to claim 2, wherein:
   said control signal is developed across the series combination of a filter capacitor and said controlled conduction device, said controlled conduction device exhibiting a high impedance in said second conductive state.

4. Apparatus according to claim 2 and further comprising a source of supply current representative of the magnitude of current conducted by said kinescope, wherein
   said signal deriving means is coupled to said current source for sensing the level of said supply current to thereby derive said control signal when said supply current exceeds the threshold level; and
   a source of reference current is coupled to said controlled device for maintaining said device in said first conductive state, said device exhibiting said second conductive state when said supply current exhibits said relatively short term variations and exceeds a predetermined level.

5. Apparatus according to claim 4, wherein
   the magnitude of said reference current exceeds said threshold level;
   said controlled device exhibits said first conductive state when the magnitude of supply current exhibits said long term variations and exceeds the threshold level; and
   said controlled device exhibits said second conductive state when the magnitude of supply current exhibits said short term variations and exceeds the magnitude of said reference current by a predetermined amount.

6. Apparatus according to claim 4 and further comprising high voltage supply means for providing an operating supply for said kinescope; and wherein
   said current source is coupled to an input of said high voltage means and said supply current corresponds to the current drawn by said kinescope from said high voltage means in accordance with the level of kinescope current conduction.

7. Apparatus according to claim 6, wherein:
   said current source provides a given current with a magnitude corresponding to said threshold level, said last-named current being supplied to said high voltage means as said supply current in accordance with the level of kinescope current conduction; and
   said controlled device exhibits said second conductive state when said supply current exceeds the sum of said reference current and said given current.

8. Apparatus according to claim 7, wherein: the level of said reference current is substantially equal to or less than the level of said given current.

9. Apparatus according to claim 4, wherein:
said controlled device comprises a semiconductor PN junction device coupled between a first point and a point of reference potential, said semiconductor being rendered conductive in response to said reference current; and
said filter means comprises a capacitor coupled to said first point and to said current source at a second point remote from said first point, for sensing said supply current.

10. Apparatus according to claim 9, wherein:
said semiconductor device is rendered non-conductive and said capacitor is decoupled from said point of reference potential when supply current exhibiting said relatively short term variations exceeds the magnitude of the said reference current by a predetermined amount.

11. Apparatus according to claim 1 and further comprising:
a channel for processing said video signals;
means for coupling video signals processed by said channel to said kinescope; and wherein
said control signal is coupled to said channel for translating the video signal in a direction to limit excessive kinescope current conduction in accordance with the magnitude of said control signal.

12. Apparatus according to claim 11, wherein:
said control signal is utilized to vary the D.C. level of signals processed by said channel in a direction to limit excessive kinescope current conduction.

13. In a television signal processing system including a kinescope for reproducing an image in response to processed television signals, apparatus for limiting excessive kinescope beam currents exhibiting relatively long term and short term variations, comprising:
a source of supply current representative of the magnitude of beam current demanded by said kinescope;
means including a filter capacitor, coupled to said current source for sensing said supply current to thereby derive a control signal representative of the magnitude of excessive beam current above a given threshold level as manifested by the level of said supply current;
means for coupling said control signal to said kinescope for limiting beam current above the threshold level in accordance with the magnitude of said control signal; and wherein
said signal deriving means additionally includes:
a threshold conducting device coupled between a terminal of said capacitor remote from said current source and a point of reference potential; and
a source of reference current for biasing said device for conduction between said capacitor terminal and said point of reference potential, the level of said reference current being in predetermined relationship with said threshold current level.

14. Apparatus according to claim 13, wherein:
said control signal is utilized to vary a luminance signal component of said television signal in a direction to limit kinescope beam current conduction above the threshold level; and
said threshold device comprises a semiconductor PN junction device poled for forward current conduction from said capacitor terminal to said reference potential.

* * * * *

UNITED STATES PATENT AND TRADEMARK OFFICE
CERTIFICATE OF CORRECTION

PATENT NO. : 4,167,025

DATED : September 4, 1979

INVENTOR(S) : Donald Henry Willis

It is certified that error appears in the above-identified patent and that said Letters Patent is hereby corrected as shown below:

Column 6, line 7, the portion "said kinetic current;" should read -- said kinescope current; --.

Signed and Sealed this

Twenty-fifth Day of March 1980

[SEAL]

Attest:

SIDNEY A. DIAMOND

Attesting Officer

Commissioner of Patents and Trademarks